April 6, 1971
A. MEDLER
3,574,104
GLASS FIBER CONSTRUCTIONAL MEMBER
Filed Jan. 24, 1968
2 Sheets-Sheet 1
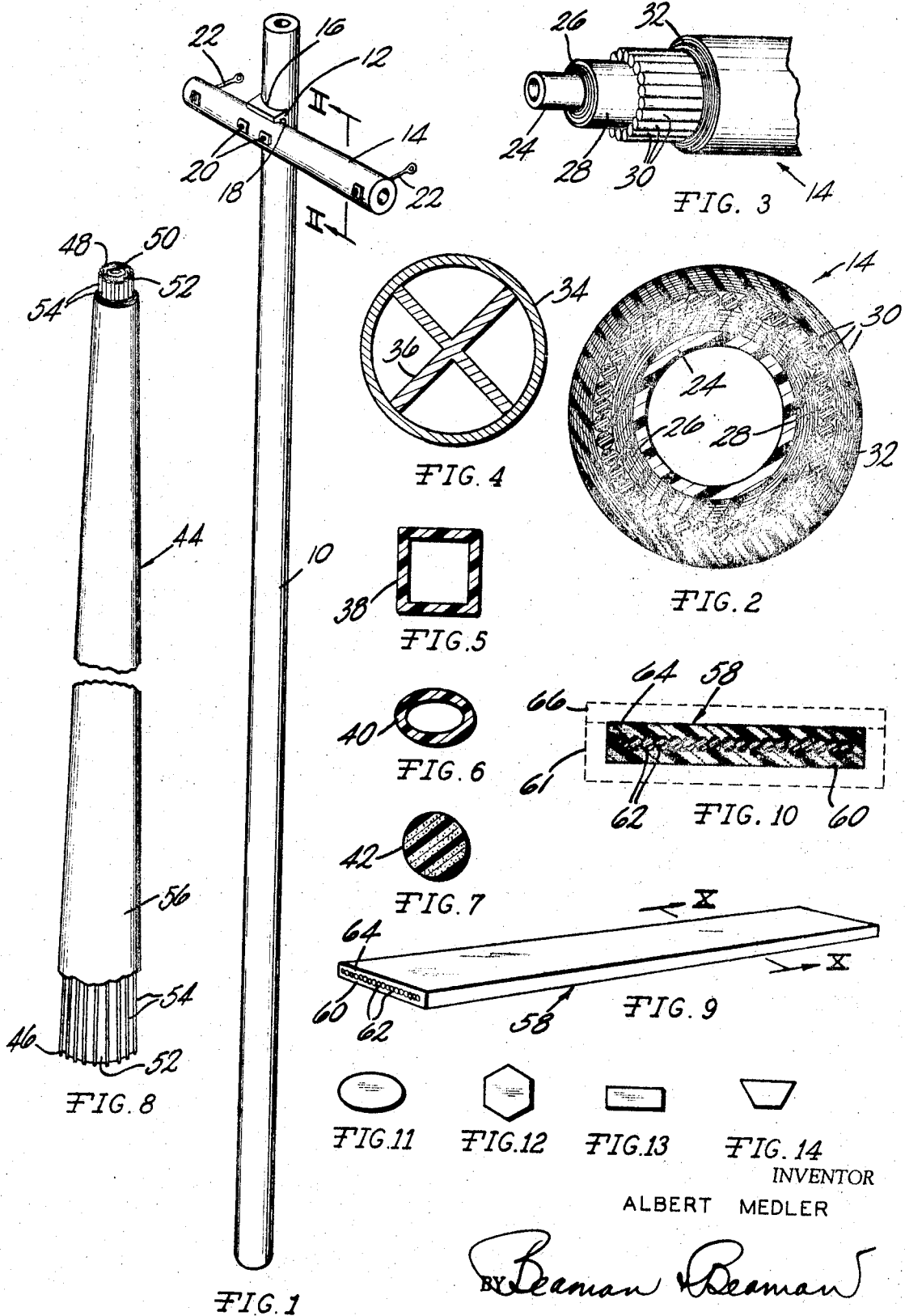
INVENTOR
ALBERT MEDLER
BY Beaman & Beaman
ATTORNEYS

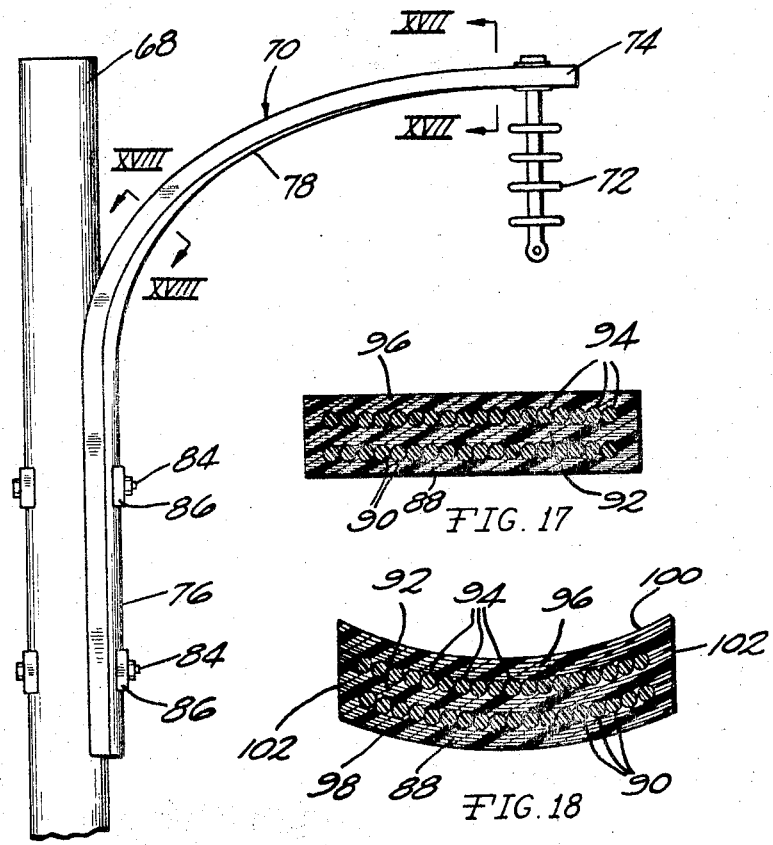
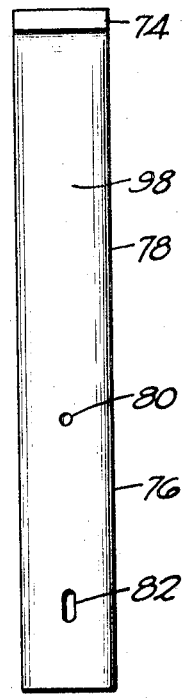
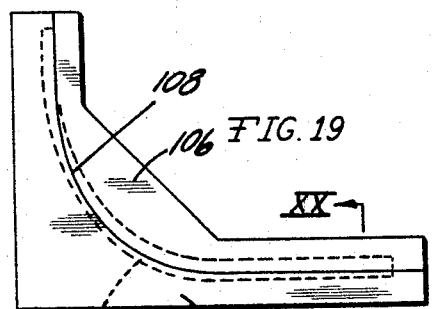
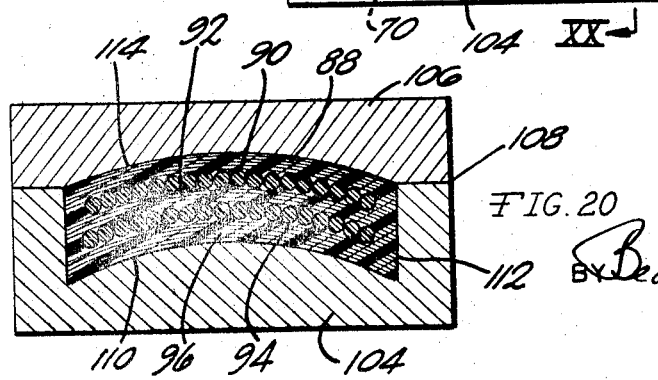
INVENTOR
ALBERT MEDLER
ATTORNEYS

United States Patent Office 3,574,104
Patented Apr. 6, 1971

3,574,104
GLASS FIBER CONSTRUCTIONAL MEMBER
Albert Medler, Jackson, Mich., assignor to Plastigage
Corporation, Jackson, Mich.
Filed Jan. 24, 1968, Ser. No. 700,287
Int. Cl. B32b 5/10, 5/28
U.S. Cl. 161—47                                14 Claims

ABSTRACT OF THE DISCLOSURE

A construction member formed of glass fiber elements impregnated with a hardened resin wherein the member has sufficient strength characteristics to be used in conjunction with other construction members, or may be used separately, such as to form a pole or the like. Superior strength characteristics are obtained by interposing glass fiber rod type elements between glass fiber fabric layers impregnated with a hardened resin wherein the resin bonds the fabric layers to each other and to the rods to produce an all glass fiber and resin member capable of withstanding high bending moment, and lateral forces, without excessive deflection.

BACKGROUND OF THE INVENTION

The invention pertains to the field of art of construction members which are fabricated of separate components of similar and chemically compatible elements, namely, glass fiber and a hardened resin, to produce improved mechanical characteristics, particularly with respect to resisting bending and lateral deflection.

A number of attempts have been made to produce acceptable poles, planks and other construction members of glass fibers impregnated with a hardened resin. U.S. Pat. 3,013,584 illustrates a tubular supporting member which was produced in order to employ the advantages of glass fiber materials. While the aforementioned patent illustrates the concept of inner and outer tubular glass fiber portions having a honeycomb interposed therebetween, the construction of prior art devices is not of such a nature as to provide the necessary resistance to bending moments and lateral deflection which is often required in a construction member. For instance, it is highly desirable to use a construction material in the manufacture of electric power transmission systems which is nonconducting, resistant to weathering and corrosive influences, relatively inexpensive, and attractive in appearance. While most lower voltage transmission poles were previously formed of wood, other materials are now being employed in order to overcome the lack of uniformity of wood transmission poles with respect to appearance and resistance to the weather. Furthermore, in that it is the tendency for wood power transmission components to bend under high lateral forces, it is necessary to use multiple components and guy cables with wood transmission components in order to produce the necessary resistance to bending. For instance, electrical utility system cross arm dead ends conventionally formed of wood are unsightly due to the necessity for using two cross arm members of relatively large cross section to provide sufficient strength characteristics to resist the bending forces imposed thereupon by the electric transmission lines.

Pole type construction members formed of glass fiber components have not heretofore had sufficient resistance to bending and flexing to permit elongated poles such as would be suitable in the electric transmission system art to be produced. Previous glass fiber construction member arrangements were unable to overcome the inherent tendency of relatively long and slender glass fiber members to bend or "whip."

SUMMARY OF THE INVENTION

The invention provides an arrangement whereby glass fiber components may be assembled in such a manner as to produce elongated construction members, such as poles, columns, posts, tubes or planks which have superior strength characteristics, and are especially resistant to lateral bending and flexing.

In the basic practice of the invention a plurality of elongated high density rods or strips formed of glass fibers impregnated with a hardened resin are interposed or sandwiched between a plurality of superimposed layers of glass fiber fabric impregnated with a hardened resin. The construction member is preferably assembled by placing the fabric upon both sides of the glass fiber rods after the rods are fully cured and completely set. The resin impregnated fabric is applied to the rods, which are generally disposed in a side by side relationship, and the resin will directly contact the rods and work into the interstices therebetween during the formation of the construction member. Upon the resin within the fabric hardening, the superimposed fabric layers will be bonded to each other, and the fabric layers will likewise be firmly bonded to the glass fiber rods.

High density glass fiber rods have excellent resistance to tension and compression forces, and the combination of the rods firmly bonded to the glass fiber fabric layers produces a construction which has superior resistance to lateral or bending forces. In particular, when the invention is utilized to form a cylinder or tube wherein the glass fiber rods are related circumferentially about an elongated axis, and the glass fiber fabric is radially interposed inwardly and outwardly with respect to the rods, excellent characteristics which resist bending are obtained.

The concepts of the invention may be used to form a member having a cross-sectional configuration which results from the shape of a core member upon which the superimposed fabric is wound in a spiral manner, or the resultant configuration of the construction member may be determined by a mold which is normally employed wherein a plank or nontubular construction is to be defined.

Usually, the fabric which is to be used will be a woven fabric and, preferably, the glass fibers of the woven fabric which extend in the longitudinal direction of the resultant construction member are continuous. Likewise, the fibers within the rods are preferably of a continuous form extending the length of the rods, and the length of the construction member. However, it is understood that the fabric which may be used could also be of the mat type wherein the glass fibers are indiscriminately arranged, or the fabric may be of a combination of woven and mat construction or of a roving construction.

BRIEF DESCRIPTION OF THE DRAWING

The concepts of the invention will be appreciated from the following specification and attached drawings wherein:

FIG. 1 is a perspective view of an electrical transmission pole and cross arm dead end assembly wherein both the pole and dead end are constructed in accord with the invention, FIG. 2 is a cross-sectional view illustrating the arrangement of the components of the cross arm dead end as taken along section II—II of FIG. 1, FIG. 3 is a perspective, "peeled," sectional view of a tubular construction member formed in accord with the invention illustrating the relationship of the various components, FIGS. 4 through 7 are elevational sectional views of various types of core constructions and configurations which may be used with tubular constructional members formed in accord with the invention, FIG. 8 is a perspective view of an embodiment of a tapered pole member utlizing the concept of the invention, portions adjacent the upper and lower ends thereof being broken away to illustrate the relationship of the glass fiber rods.

FIG. 9 is a perspective view af a plank type construction member utilizing the inventive concept of the invention, FIG. 10 is an elevational, sectional view of the plank of FIG. 9 as taken along section X—X thereof, FIGS. 11 through 14 are elevational end views of various configurations of glass fiber rods which may be used in accord with the invention, FIG. 15 is an elevational view of a utility pole having a bracket formed in accord with the invention, FIG. 16 is a view of the bracket, per se, as taken from the right of FIG. 15, FIGS. 17 and 18 are elevational sectional views of the bracket taken along sections XVII—XVII and XVIII—XVIII of FIG. 15, FIG. 19 is a side elevational view of a mold in which the bracket of FIGS. 15–18 may be formed, and FIG. 20 is an elevatioinal sectional view taken along section XX—XX of FIG. 19.

DESCRIPTION OF THE PREFERRED EMBODIMENTS

In FIG. 1, a vertically disposed construction member 10 in accord with the invention forms a pole which would be set into a hole, and the pole may be of considerable length, for instance, between thirty and forty feet. Near the upper end of the pole 10 a bracket 12 is used to affix across arm dead end 14 thereto. The bracket 12 includes cylindrical segment surface portions 16 and 18 which coact with the outer surfaces of the pole and dead-end, respectively, and bolts 20 extending through holes drilled in the pole and dead-end affix the dead end and bracket to the pole. The dead end 14 is constructed in a manner identical to that of the pole 10, but is of a smaller diameter. Near the ends of the dead end horizontally extending holes are formed for receiving eye bolts 22 having associated nuts and washers whereby transmission lines, not shown, may be directly attached to the eye bolts, or conventional insulators attached to the eye bolts to which the transmission lines are then fixed. Considerable bending forces are applied to the dead end, and public utility specifications closely limit the amount of deflection, permissible with a dead end of this type.

The construction of the pole 10 and the dead end 14 is such as to result in a tubular construction member having a cylindrical outer surface. The internal arrangement of components of the pole and dead end will be apparent from FIGS. 2 and 3. A tubular core member is employed, upon which the innermost layers of glass fiber fabric are wound. The core 24 may consist of a tube of plastic material, paper, or other material which is relatively inert, and nonconductive. The core 24 adds little to the strength characteristics of the resultant construction member, and is basically employed to form the shape of the member, and provides a base upon which to build up the other components. The core 24 will be of a length equal to that of the desired construction member. A glass fiber fabric is spirally wound upon the core 24 in such a manner that the superimposed layers of the fabric provide an inner portion 26 which is of a cylindrical configuration, having an inner diameter equal to the outer diameter of the core, and a circumference 28 having a diameter which is determined by the amount of glass fiber fabric wound upon the core.

Glass fiber fabric is available in rolls of considerable length, and of various widths. For instance, a roll of glass fiber fabric having a width of forty-eight inches may be used in forming construction members in accord with the invention. The operator unrolls a length of fabric from the supply roll which is equal to the length of the desired construction member, and this length is severed from the supply roll. The fabric is then impregnated with a hardenable resin, such as epoxy, a polyester compound, or a phenolic compound. Thereupon, the resin impregnated fabric is spirally wound widthwise tightly upon the core 24 to form the spirally wound inner portion 26, FIG. 2. If a greater radial thickness of the inner portion 26 is desired than is obtainable with a fabric of forty-eight inches width, a second length may be unrolled from the supply roll, and impregnated with the hardenable resin and thereupon wound over the first length of glass fiber fabric wound upon the core.

After sufficient glass fiber fabric has been wound on the core 24 to form the inner portion 26 the operator will then place a plurality of high density glass fiber rods 30 in side by side substantially contiguous relationship upon the circumference 28 of the inner portion 26 substantially parallel to the axis of the core. The rods 30 in the illustrated embodiment are of a cylindrical configuration and are of a length equal to the length of the construction member desired. The rods 30 are disposed completely about the inner portion circumference 28, and may be readily located in position due to the relatively tacky or sticky consistency of the resin within the fabric previously applied to the core 24. The application of the rods 30 to the inner portion will cause resin within the fabric to work into the voids between the rods, eliminating the occurrence of voids in the region occupied by the rods and resulting in a solid, homogeneous connection between the rods and fabric.

The rods 30 may be formed in a manner as disclosed in U.S. Pat. 2,684,318. Such rods are formed of glass fiber filaments impregnated with a hardened resin while under tension, and drawn through a sizing dye. The rods may be ground after the resin has set and cured, if desired wherein the rods will be of an accurate uniform diameter or the sizing may remain as that determined by the forming die.

After the rods 30 are disposed and placed upon the circumference 28 of the fabric inner portion 26, a fabric outer portion 32 is wound upon the rods. The outer portion 32 is wound upon the rods 30 in a manner similar to the winding of the inner portion 26 upon the core 24. A length of glass fiber fabric is unrolled from the supply roll equal to the length of the desired construction member, and impregnated with the hardenable resin. The fabric is then spirally wound widthwise upon the rods 30. Several lengths of fabric may be wound upon each other to form the outer portion 32 until the desired radial thickness is produced which results in the required physical characteristics of the particular construction member being manufactured. As the glass fiber fabric forming the outer portion 32 is spirally wound upon the rods 30 the resin within the fabric will enter the voids between the rods dispoied toward the outer portion fabric, and the resin will produce a solid, homogeneous bonding between the outer fabric portion 32 and the rods 30.

Since the core 24 of the embodiment of FIGS. 1–3 is of a cylindrical configuration, the resultant configuration of the member will be cylindrical, and only the outermost layer of the fabric outer portion 32 will be visible. As the impregnated fabric provides a pleasing appearance, further treatment, such as paint, of the construction member is not necessarily required. If a color is desired, the coloring may be directly introduced into the resin to provide a permanent appearance to the construction member, or the member could be painted.

The impregnation of the fabric of the inner and outer portions 26 and 32 with the hardenable resin causes the adjacent fabric layers to be homogeneously bonded together when the resin sets. Additionally, the presence of the resin in direct engagement with the rods 30 results in firmly bonding the rods in a chemically compatible manner to the inner and outer portions 26 and 32 wherein a completely integral and homogeneous member is defined.

The fabric used to form the portions 26 and 32 may be of most of the fabric sheet material available for glass fiber construction purposes, such as woven fabric, mat or roving. The preferred fabric is of the woven type having glass fiber filaments which extend the length of the construction member being formed and filaments which are spirally wound about the member core and are disposed at approximately right angles to the length of the member. This type of woven fabric thereby disposes its filaments in the directions which are most effective to resist lateral bending of the member.

The resultant construction member has extraordinary resistance to fracturing and lateral or bending deflection. Such resistance to greater than that which is produced by a plurality of glass fiber rods bonded together, and greater than that provided with a constructional member consisting solely of spirally wound fabric impregnated with a hardened resin. It is believed that the improved resistance to bending is produced by the fact that bending forces imposed upon the member produce tension forces in approximately one-half of the rods 30, and compression forces on the other half of the rods due to the radial spacing of the rods from the axis of the member. Relative axial shifting between the fabric portions and rods is not possible, due to the bond created by the resin, and the excellent tension and compression resistance characteristics of the dense glass fiber rods, radially located from the axis of the construction member produces excellent resistance to lateral deflection.

Thus, an all glass fiber construction member is produced which provides the dielectric, noncorrosive and appearance advantages of glass fiber, while producing very high resistance to lateral deflection.

FIGS. 4 through 7 illustrate various types of cores which may be used in the practice of the invention. FIG. 4 illustrates a cylindrical core 34 which may be formed of paper or other inexpensive material internally supported by a cross web 36. In this manner a light weight core can be protected against collapse during formation of the construction member. FIG. 5 illustrates a rectangularly shaped synthetic plastic core 38 which would be used if a construction member having a rectangular outer configuration, rather than a cylindrical configuration, is desired. Likewise, FIG. 6 illustrates an elliptical core 40 which may be formed of plastic, paper or other material which would result in an oval or elliptical construction member. FIG. 7 illustrates a core 42 formed of solid plastic foam material, such as urethane foam. The illustrated core is cylindrical in configuration, but, of course, other cross-sectional shapes of foam can be utilized. Hard urethane foam has sufficient strength to permit wrapping of the fabric layer inner portion 26 thereupon, and is inexpensive.

It will be appreciated that it is not necessary to use a core at all, in the practice of the invention. A greased mandrel could be used upon which the inner portion 26 is wound, and upon the resin setting, the mandrel could be withdrawn from the inner portion. Also, in the event that a substantially solid construction member is desired the inner portion 26 could be tightly wound upon itself without a core and would be solid, rather than tubular in configuration.

FIG. 8 illustrates a tapered construction member, such as a pole 44, wherein the diameter of the construction member at the lower end 46 is greater than at the upper end 48. The tapered configuration can be produced by using a conical core 50, or the core may be cylindrical but the inner fabric portion 52 is applied to the core in such a manner that the radial thickness of the portion increases toward the pole lower end. Such a variable radial thickness would be accomplished by using a fabric of a length less than that of pole 44 and applying a greater number of fabric layers adjacent the lower end than adjacent the upper end. After the inner portion 52 is wound upon the core the outer circumference of the inner portion varies throughout its length from the lower end 46 to the upper end 48.

In the embodiment of FIG. 8 the glass fiber rods 54 are disposed in contiguous relationship to each other adjacent the upper end 48. However, due to the larger diameter and circumference of the fabric inner portion 52 adjacent the lower end 46 the rods 54 will be circumferentially spaced from each other, as is apparent from the drawing. After the rods 54 are located upon the inner portion 52, the outer portion 56 of resin impregnated fabric is wound upon the rods to form the member in the manner previously described. The embodiment of FIG. 8 will have the pleasing appearance of a tapered construction, which is particularly suitable in a pole, and if the tapered configuration results from a greater thickness of the inner portion 52 adjacent the lower end 46 variable strength characteristics throughout the length of the pole are achieved.

A plank or other noncircular configuration of construction member may be formed utilizing the concepts of the invention. In FIGS. 9 and 10 the plank 58 has an outer rectangular configuration which is formed by molding the plank within a mold having a rectangular cavity. In the formation of the plank of FIGS. 9 and 10 several layers 60 of glass fiber fabric are laid in the bottom of the mold 61, shown in dotted lines in FIG. 10, to cover the entire area of the cavity. After the several layers 60 of glass fiber are positioned in the mold and these layers are impregnated with a hardenable resin, glass fiber rods 62 are disposed in contiguous relationship to each other extending throughout the length of the mold. The rods 62 extend parallel to the length of the mold, and after being placed upon the lower fabric layers 60, additional resin impregnated layers 64 of glass fiber fabric are superimposed upon the rods. As in the previously described embodiment, the fabric resin will fill the interstices between the rods 62 and the plank having a cross section as represented in FIG. 10 is produced upon placing the top half 66 of the mold upon the cavity portion 61 thereof. The resultant intimate bonding between the glass fiber fabric layer portions 60 and 64 and rods 62 produces a construction member 58 of superior strength capable of withstanding tension and compression forces, and highly resistant to lateral deflection.

FIGS. 11 through 14 illustrate various cross-sectional configurations of high density glass fiber rods which may be used in the practice of the invention, and it is to be understood that the inventive concepts are not limited to rods of circular configuration. For instance, elliptical, hexagonal, rectangular and keystone shaped rods may be used. As mentioned above it is preferred that such rods are formed of glass fiber extending the length of the rods whereby superior resistance to tension and compression forces is obtained.

FIGS. 15 through 20 are directed to another construction member constructed in accord with the invention which uses the inventive concepts thereof in a bracket of the cantilever type which may be affixed to utility electrical system poles for the support of insulators and conductors, lights, or other accessories. In FIG. 15 the upper portion of a pole 68 is illustrated having a bracket 70 which is affixed thereto. The pole 68 is preferably constructed in a manner similar to the pole 10, in accordance with the previously described embodiment.

The bracket 70 is attached to the upper end of the pole 68 for the purpose of supporting insulators 72 at the free end thereof. A conductor would normally be supported by the insulator 72.

The bracket 70 includes a free end 74 to which the insulator 72 depends. The lower end of the bracket includes a portion 76 which is affixed to the pole 68, and the curved intermediate portion of the bracket is indicated at 78.

The bracket 70 is attached to the pole 68 by means of bolts extending through holes 80 and 82, FIG. 16, defined through the bracket portion 76. If desired, the hole 82 may be of an elongated form to compensate for minor dimensional variations existing in the pole bolt holes. Bolts 84 extend through drilled holes in the pole 68, and also extend through the bracket holes 80 and 82 wherein the arcuate plates 86 may be located under the bolt nuts to eliminate localized stress points upon the bracket 70 when the nuts of the bolt 84 are tightened to firmly affix the bracket 70 to the pole 68.

The bracket 70 may basically be considered to be of a "plank" form. However, the bracket is curved in a longitudinal direction as is apparent from FIG. 15, and is also provided with arcuate surfaces extending in a transverse direction, as will be later described.

The bracket 70 is formed by a molding operation of glass fiber fabric and glass fiber rods, assembled and bonded together in a manner somewhat similar to that described above with respect to the foregoing embodiments. As shown in FIGS. 17 and 18, the bracket includes a portion 88 which consists of a plurality of superimposed layers of glass fiber fabric impregnated with a hardenable resin. A plurality of high density glass fiber rods 90 are disposed adjacent the glass fiber fabric portion 88 in such a manner that the rods are substantially contiguous to each other in a side-by-side relationship, and extend the length of the bracket.

An intermediate glass fiber fabric portion 92 consisting of a plurality of glass fiber fabric layers impregnated with a hardened resin are disposed upon the opposite side of the rods 90, with respect to the glass fiber fabric portion 88, and the resin within the portions 88 and 94 will fill the interstices intermediate the rods 90.

Another layer or series of high density glass fiber rods 94 is included within the bracket 70 disposed adjacent the intermediate fiber portion 92, and these rods are related to each other in a manner similar to the previously described rods 90. The third glass fiber fabric portion 96 is disposed adjacent the rods 94 upon the opposite side thereof with respect to the portion 92, and the portion 96 is similar in composition and assembly to the portion 88.

The resultant cross-sectional configuration of the bracket 70 will be appreciated from FIGS. 17 and 18, wherein the bracket will be formed solely of glass fiber components of both fabric and rod character.

The free end of the bracket 70 is preferably of a flat rectangular cross section as is apparent in FIG. 17. However, except for that bracket portion 74 immediately adjacent the free end of the bracket, the remaining length of the bracket 70 is preferably of a convex-concave configuration is apparent from FIG. 18. Thus, the convex-concave cross-sectional configuration of the bracket 70 will include a convex surface 98 and a concave surface 100. The edges 102 are preferably substantially parallel and are related to the surfaces 98 and 100 in a manner that will be apparent from FIG. 18.

The radius of the bracket surface 100 preferably substantially corresponds to the radius of the pole 68. Thus, upon mounting the bracket 70 upon the pole 68 in the manner illustrated, a solid connection of the bracket to the pole is assured which prevents the existence of localized stresses on the bracket portion 76, and also aligns the bracket portion 76 with the longitudinal axis of the pole 68.

The bracket 70 may be formed in a mold shown in simplified form in FIGS. 19 and 20. In its simplest form the mold may be of metal, wood or glass fiber consisting of a lower portion 104, and an upper portion 106. The parting line between the mold portions is represented at 108. A recess 110 is defined within the mold portion 104 having a convex surface in order to form the concave surface 100. The recess 110 is defined by the edge surfaces 112. The uppermost portion 106 includes a concave surface 114 which determines the configuration of the convex surface 98 of the bracket.

The bracket 70 is formed by laying a plurality of glass fiber fabric strips within the mold recess 110, wherein the strips are of a length equal to the cavity, and of a width substantially equal to that defined by the edge surfaces 112. A sufficient number of glass fiber fabric layers are positioned within mold recess 110 to define the thickness of the bracket portion 96 desired. Thereupon, a plurality of high density glass fiber rods 94 are laid in contiguous side-by-side relationship upon the fabric forming the portion 96. After the rods 94 are located in place, the intermediate glass fiber portion 92 is build up upon the rods 94 by a plurality of glas fiber fabric layers impregnated with a hardenable resin. When the proper thickness of portion 92 has been achieved the rods 90 are therein laid upon the portion 92 in side-by-side relationship, and the glass fiber fabric portion 88 is then built up upon the rods 90 with a plurality of fabric layers. The uppermost portion 106 is then laid in place which will shape the surface 98 in accord with the mold recess 114. After the bracket 70 has hardened it may be removed from the mold, and the ends may be trimmed, if desired. The holes 80 and 82 are preferably drilled into the bracket.

As in the previously described embodiments of the invention, the fabrication of bracket 70 will completely fill the interstices between the rods 90 and 96 with hardenable resin with which the glass fiber is impregnated. Thus, a solid, homogeneous bracket will be formed. It is to be noted that in the drawings of all of the embodiments the resin filling the interstices between the rods is not illustrated by shading in order to prevent obscuring the relationship between the rods and the adjacent glass fiber portions. The bending stress that is placed upon the bracket 70 due to the weight of the conductor connected to the insulator 72 will place the rods 94 in tension, while the rods 90 will tend to be in compression. By separating the rods 90 and 94 by the intermediate glass fiber fabric portion 92 the rods are thus able to add considerable strength to the bracket 70 over the strength which would be present if the bracket were entirely formed of glass fiber fabric without rods. As the rods 90 and 94 are spaced from the neutral axis of the bracket, with respect to lateral bending stresses, the construction of the bracket 70 is more effective to resist bending than is the construction utilized in the manufacture of plank 58. Also, the convex-concave configuration of the bracket 70 itself contributes to strengthening the bracket against lateral deflection.

While several of the illustrated embodiments formed in accord with the invention are utilized in the electrical power transmission system art it will be appreciated that the inventive concepts find wide use in a wide variety of the construction and building arts. The invention is described in conjunction with electrical power transmission devices in that the high strength, resistance to corrosion, dielectrical characteristics and attractive appearance of components constructed in accord with the invention are highly desirable in this particular art.

It is appreciated that various modifications to the inventive concepts may be apparent to those skilled in the art without departing from the spirit and scope thereof, and it is intended that the invention be defined only by the following claims.

I claim:

1. A construction member primarily composed of glass fibers bonded together with a hardened resin comprising, in combination, a plurality of elongated, high density glass fiber rods each consisting of a plurality of longitudinally disposed glass fibers bonded together with a hardened binder resin while under tension, a plurality of superimposed layers of glass fiber fabric material, said rods being sandwiched between layers of said fabric material and a hardened binder resin impregnating said fabric material bonding the fibers of said material to each other and bonding said layers together and bonding said fabric material to said rods.

2. A construction member as in claim 1 wherein said rods are substantially parallel to each other and are disposed in substantially side by side relationship.

3. A construction member as in claim 1 wherein said rods are disposed in substantially side by side relationship.

4. A construction member as in claim 3 wherein said layers of fabric material are spirally wound about the longitudinal axis of said member.

5. An elongated construction member primarily composed of glass fibers bonded together with a hardened binder resin comprising, in combination, an inner portion comprising several layers of glass fiber fabric impregnated with a hardened binder resin spirally wound upon itself about an axis defining the longitudinal axis of the member and defining a circumferential surface, a plurality of elongated glass fiber rods located upon said inner portion circumferential surface and bonded thereto with a bonder resin, said rods being disposed in the longitudinal direction of the axis of said member, and an outer portion comprising several layers of glass fiber fabric impregnated with a hardened binder resin spirally wound about said inner portion and upon said rods and upon itself, said outer portion layers adjacent said rods being bonded to said rods whereby said rods are disposed between and bonded to both said inner and outer portions.

6. A construction member as in claim 5 wherein said member includes a first end and second end, the transverse cross-sectional dimension of said inner portion circumferential surface adjacent said second end being greater than at said first end whereby said member is of a tapered configuration and the circumferential spacing between adjacent rods being greater at said second end than at said first end.

7. In a construction member as in claim 5, an elongated core, said glass fiber layers comprising said inner portion being spirally wound upon said core.

8. A construction member as in claim 5 wherein said rods consist of continuous filament glass fibers bonded together by a hardened binder resin and said rods are disposed in substantially parallel relation to the member axis and to each other and radially separate the fabric layers of said inner and outer portions.

9. In a construction member as in claim 8 wherein said rods are in contiguous side of side relationship.

10. A construction member of glass fibers bonded together with a hardened binder resin comprising, in combination, first and second pluralities of layers of glass fiber fabric impregnated with a hardened binder resin whereby said first layers are superimposed upon each other and bonded together and said second layers are superimposed upon each other and bonded together, and a plurality of parallel glass fiber rods disposed between said first and second layers of fabric and bonded to said layers by a hardened binder resin, each of said rods consisting of a plurality of longitudinally disposed glass fibers bonded together with a hardened binder resin while under tension to form a high density rod.

11. An elongated construction member composed of glass fibers bonded together with a hardened binder resin comprising, in combination, a plurality of glass fiber fabric layers impregnated with a hardened binder resin extending the length of said member defining a central fabric layer portion having first and second lateral side surfaces, a plurality of glass fiber rods disposed on each of said central layer portion sides and bonded thereto by a hardened binder resin, each of said rods consisting of a plurality of longitudinally disposed glass fibers bonded together with a hardened binder resin while under tension to form a high density rod, said rods defining first and second rod layers and each rod being of a length substantially equal to the length of said member and disposed substantially parallel thereto and to each other, a plurality of glass fiber fabric layers impregnated with a hardened resin disposed upon said first rod layer throughout the length thereof on the opposite side of said first rod layer with respect to said central portion and bonded to said first rod layer by a hardened resin defining a first outer fabric layer portion having an outer surface, and a plurality of glass fiber fabric layers impregnated with a hardened resin disposed upon said second rod layer throughout the length thereof on the opposite side of said second rod layer with respect to said central portion and bonded to said second rod layer by a hardened resin defining a second outer fabric layer portion having an outer surface whereby said member comprises first and second layers of spaced glass fiber rods disposed intermediate layers of glass fiber fabric, said fabric layers being impregnated with a hardened resin and said rods being bonded to adjacent fabric layers by a hardened resin.

12. An elongated construction member as in claim 11 wherein the adjacent glass fiber rods within each of said rod layers are substantially contiguous.

13. An elongated construction member as in claim 11 wherein said fabric and rod layers are of an arcuate configuration in a transverse sectional direction and said first outer fabric layer portion outer surface is transversely convex and said second outer fabric layer portion outer surface is transversely concave.

14. In an elongated construction member as in claim 13 wherein said member forms a bracket and said member is longitudinally curved in the direction of said convex outer surface.

References Cited

UNITED STATES PATENTS

| | | | |
|---|---|---|---|
| 2,726,185 | 12/1955 | Howald | 161—176X |
| 2,742,931 | 4/1956 | Ganahl | 138—76 |
| 3,442,738 | 5/1969 | Scott et al. | 156—161 |
| 3,457,962 | 7/1969 | Shobert | 161—176X |

FOREIGN PATENTS

| | | | |
|---|---|---|---|
| 556,257 | 4/1958 | Canada | 161—Glass Fabric Dig. |
| 627,255 | 8/1949 | Great Britain | 161—176 |

WILLIAM A. POWELL, Primary Examiner

U.S. Cl. X.R.

138—144; 156—186, 188, 222, 245; 161—60, 93, 125, 143, 168, 176, 178, 179; 264—258